(12) United States Patent
Lin

(10) Patent No.: US 10,288,824 B2
(45) Date of Patent: May 14, 2019

(54) OPTICAL TRANSCEIVER

(71) Applicant: Prime World International Holdings Ltd., New Taipei (TW)

(72) Inventor: Huan-Yu Lin, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/722,317

(22) Filed: Oct. 2, 2017

(65) Prior Publication Data

US 2019/0103920 A1  Apr. 4, 2019

(51) Int. Cl.
*G02B 6/42* (2006.01)
*H04B 10/40* (2013.01)

(52) U.S. Cl.
CPC ......... *G02B 6/4261* (2013.01); *G02B 6/4246* (2013.01); *G02B 6/4292* (2013.01); *H04B 10/40* (2013.01)

(58) Field of Classification Search
CPC .................................................. G02B 6/4261
See application file for complete search history.

(56) References Cited

U.S. PATENT DOCUMENTS

| | | |
|---|---|---|
| 3,944,040 A | 3/1976 | Richard |
| 6,048,001 A | 4/2000 | Miller et al. |
| 6,447,170 B1 * | 9/2002 | Takahashi .......... H01R 13/6273 |
| | | 385/53 |
| 6,886,222 B2 | 5/2005 | Vitry |
| 6,957,979 B2 | 10/2005 | Welsh et al. |
| 7,032,939 B2 | 4/2006 | Magnusson |
| 7,066,765 B2 | 6/2006 | Togami et al. |
| 7,185,927 B2 | 3/2007 | Talukdar et al. |
| 7,204,712 B2 | 4/2007 | Schwiebert et al. |
| 7,313,937 B2 | 1/2008 | Straka, Jr. |
| 7,374,347 B1 * | 5/2008 | Oki ..................... G02B 6/4201 |
| | | 385/88 |
| 7,422,457 B1 | 9/2008 | Wu |
| 7,537,476 B1 | 5/2009 | McColloch |
| 7,566,245 B1 | 7/2009 | McColloch |
| 7,648,289 B2 | 1/2010 | Miyoshi et al. |

(Continued)

OTHER PUBLICATIONS

U.S. Office Action dated Nov. 29, 2018, received in U.S. Appl. No. 15/850,766, 14 pgs.

*Primary Examiner* — Michelle R Connelly
(74) *Attorney, Agent, or Firm* — Grossman Tucker Perreault & Pfleger, PLLC

(57) ABSTRACT

An optical transceiver, pluggable into a cage, includes a case, a fastening component, and a driving component. The case defines a supporting surface. The fastening component is movably disposed in the case to be at either a fastening position or a releasing position. The fastening component defines a pressed slope, and the pressed slope defines a first end and a second end connected to each other. A vertical distance between the first end and the supporting surface is different from a vertical distance between the second end and the supporting surface. The driving component is disposed in the case. The driving component is movable relative to the fastening component along a pressing direction to press the pressed slope. The fastening component is movable to the releasing position by interaction between the fastening component and the driving component.

17 Claims, 10 Drawing Sheets

(56) References Cited

U.S. PATENT DOCUMENTS

| | | |
|---|---|---|
| 7,901,017 B1 | 3/2011 | Kafferlin |
| 8,506,172 B2 * | 8/2013 | Meadowcroft ...... G02B 6/4261 |
| | | 385/147 |
| 8,790,022 B2 | 7/2014 | Yi |
| 8,986,036 B2 | 3/2015 | Lindkamp |
| 9,028,155 B2 | 5/2015 | Wang et al. |
| 9,176,289 B2 | 11/2015 | Yi |
| 9,348,101 B2 | 5/2016 | Wang et al. |
| 9,470,859 B2 | 10/2016 | Arekar et al. |
| 9,523,826 B2 | 12/2016 | Tsai et al. |
| 9,798,099 B2 | 10/2017 | Nguyen |
| 9,841,568 B2 | 12/2017 | Wang et al. |
| 2003/0198025 A1 | 10/2003 | Cao |
| 2005/0226587 A1 * | 10/2005 | Minota ................ G02B 6/4292 |
| | | 385/134 |
| 2009/0321301 A1 | 12/2009 | Song et al. |
| 2012/0106903 A1 | 5/2012 | Thirugnanam et al. |
| 2014/0038447 A1 * | 2/2014 | Brown .................. H01R 13/62 |
| | | 439/350 |
| 2014/0126957 A1 * | 5/2014 | Shi ...................... G02B 6/4246 |
| | | 403/322.1 |
| 2014/0168906 A1 | 6/2014 | Yi |
| 2014/0169749 A1 | 6/2014 | Yi |
| 2015/0263453 A1 | 9/2015 | Wang et al. |
| 2015/0331210 A1 | 11/2015 | Lee |
| 2016/0130840 A1 | 5/2016 | Garneau |
| 2016/0174394 A1 | 6/2016 | Lee |
| 2016/0178856 A1 | 6/2016 | Chang et al. |
| 2016/0216460 A1 * | 7/2016 | Yang .................... G02B 6/4284 |
| 2016/0252691 A1 | 9/2016 | Arekar et al. |
| 2016/0341913 A1 * | 11/2016 | Wang ................ H01R 13/6335 |
| 2018/0252880 A1 | 9/2018 | Chung et al. |

\* cited by examiner

OPTICAL TRANSCEIVER

TECHNICAL FIELD

The present disclosure relates to an optical transceiver, more particularly to a pluggable optical transceiver.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications have been provided such as XFP (10 Gigabit Small Form Factor Pluggable) used in 10 GB/s communication rate and QSFP (Quad Small Form-factor Pluggable).

SUMMARY

According to one aspect of the present disclosure, an optical transceiver, pluggable into a cage, includes a case, a fastening component, and a driving component. The case defines a supporting surface. The fastening component is movably disposed in the case to be at least at either a fastening position or a releasing position. The fastening component defines a pressed slope, and the pressed slope defines a first end and a second end. A vertical distance between the first end and the supporting surface is different from a vertical distance between the second end and the supporting surface. The driving component is disposed in the case. The driving component is movable relative to the fastening component along a pressing direction to press the pressed slope. The fastening component moves to the releasing position by interaction between the fastening component and the driving component, and the pressing direction is non-orthogonal to a normal direction of the pressed slope. The fastening component is fastened to a fastening hole of the cage when the fastening component is at the fastening position. The fastening component is released from the fastening hole when the fastening component is at the releasing position.

According to another aspect of the present disclosure, an optical transceiver includes a case, a fastening component, and a driving component. The case defines a supporting surface. The fastening component is movably disposed in the case. The fastening component defines a pressed slope, and the at least one pressed slope defines a first end and a second end. A vertical distance between the first end and the supporting surface is different from a vertical distance between the second end and the supporting surface. The driving component is disposed in the case and defines a pressing slope facing the pressed slope. The pressing slope defines a third end and a fourth end. A vertical distance between the third end and the supporting surface is different from a vertical distance between the fourth end and the supporting surface. The pressed slope and the pressing slope both extend along substantially the same direction. The driving component is movable relative to the case press the fastening component with interaction between the at least one pressing slope and the at least one pressed slope.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
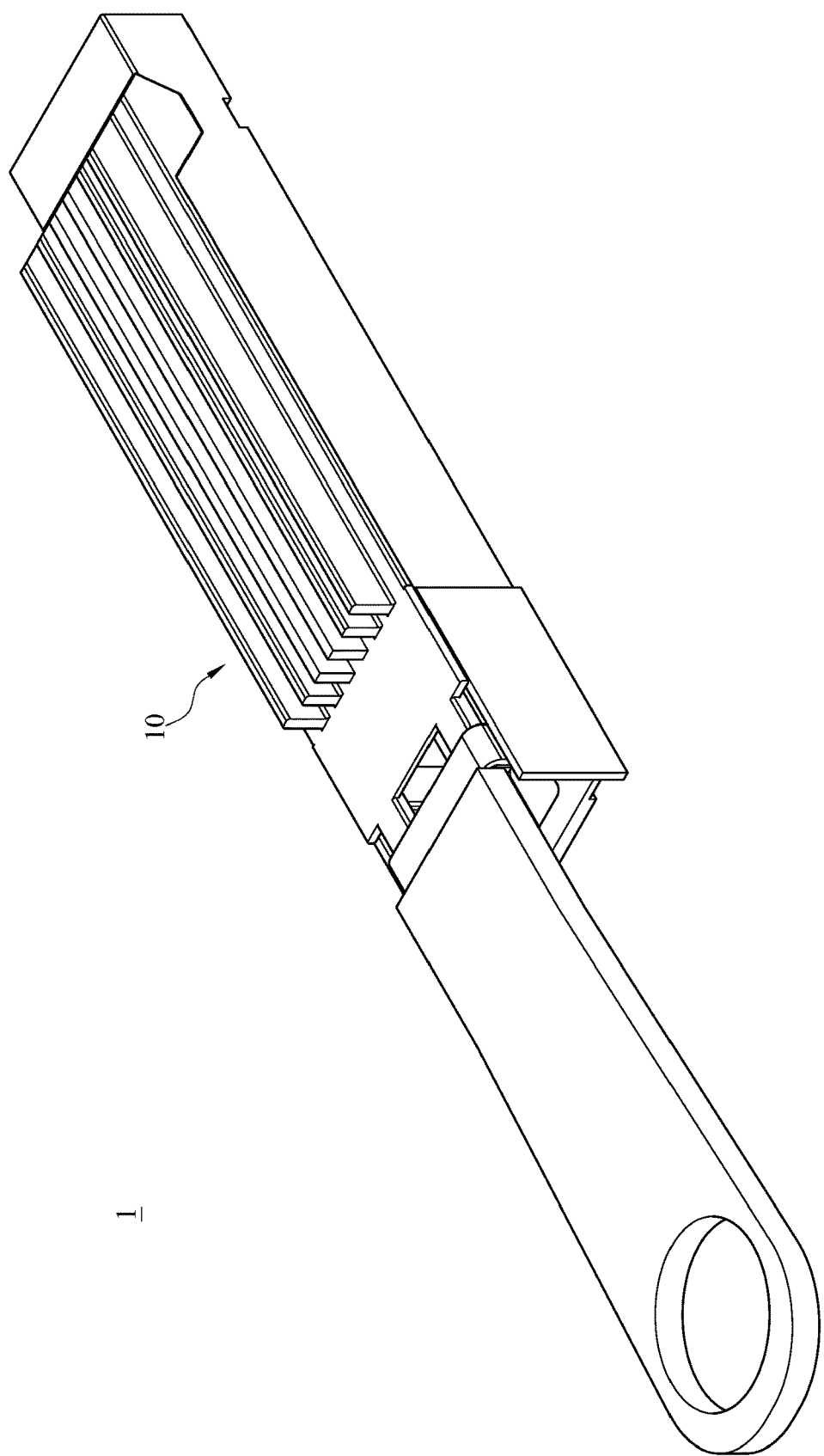
FIG. 1 is a perspective view of an optical transceiver according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
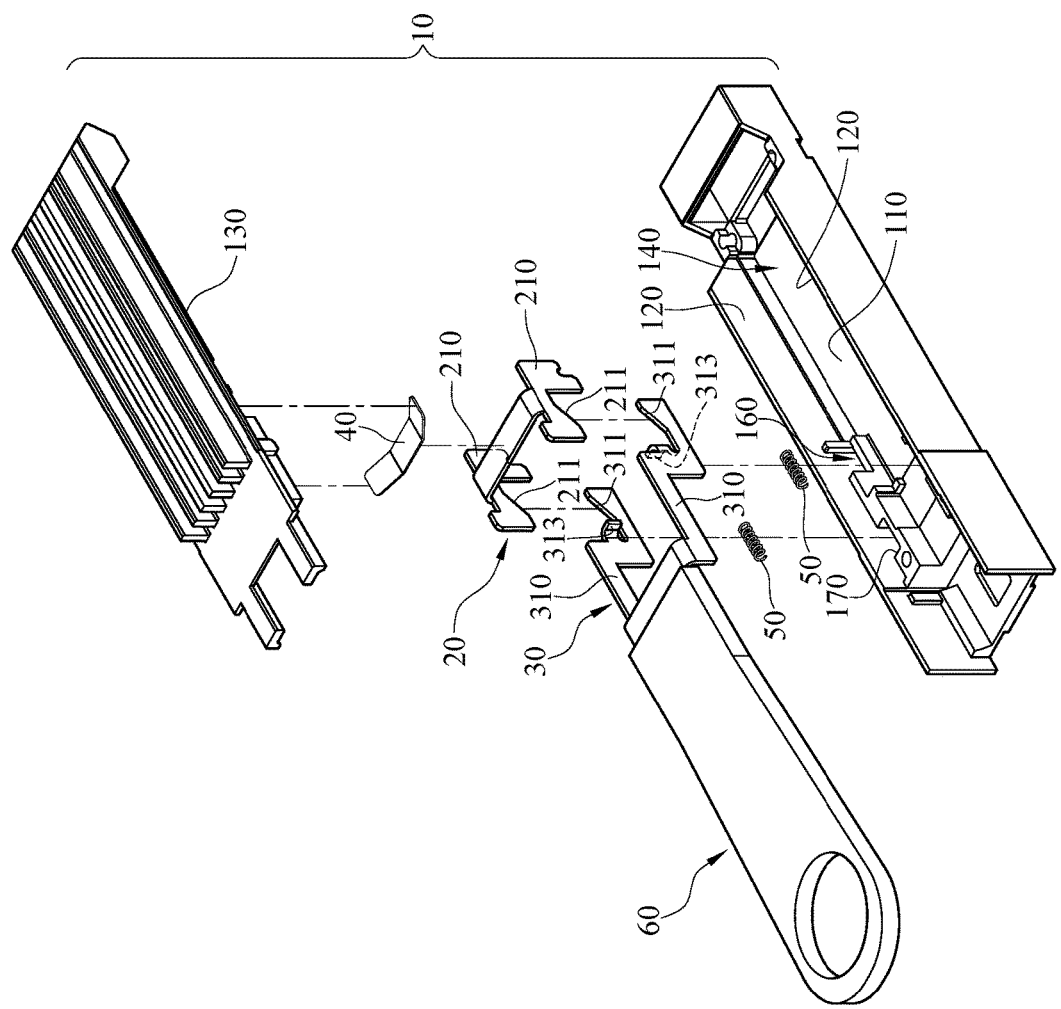
FIG. 2 is an exploded view of the optical transceiver in FIG. 1.
Figure 3:
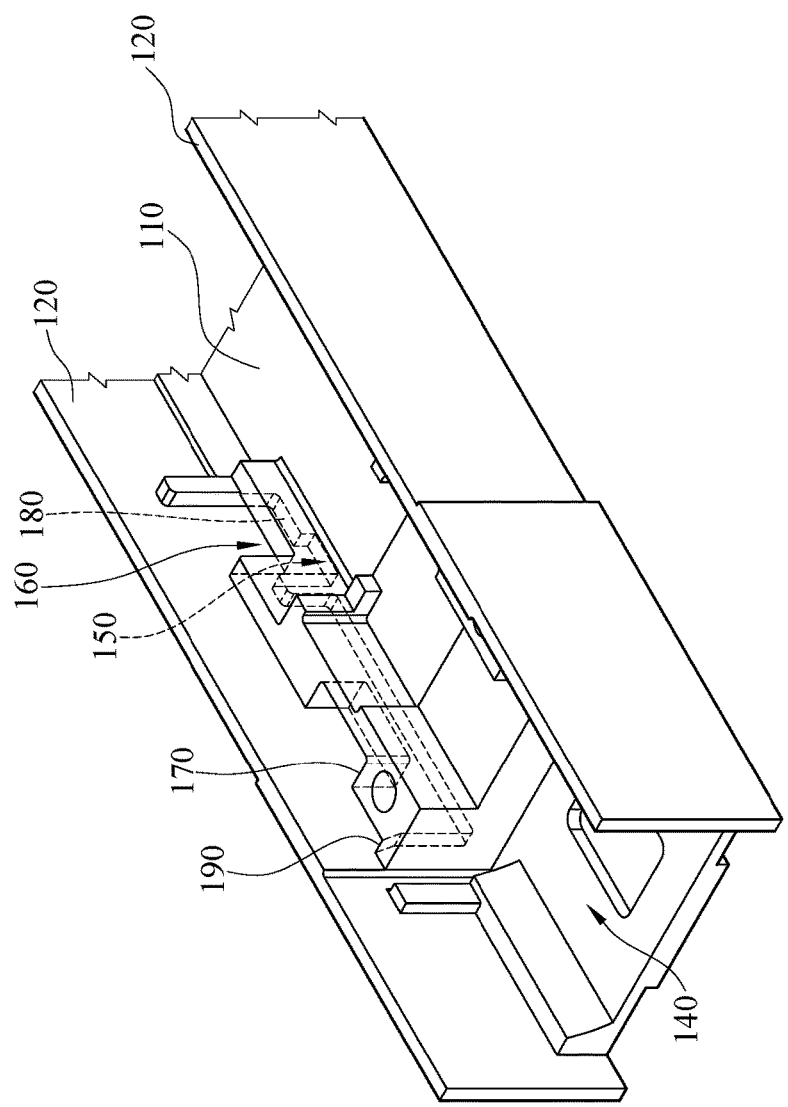
FIG. 3 is an enlarged view of a case of the optical transceiver in FIG. 2.
Figure 4:
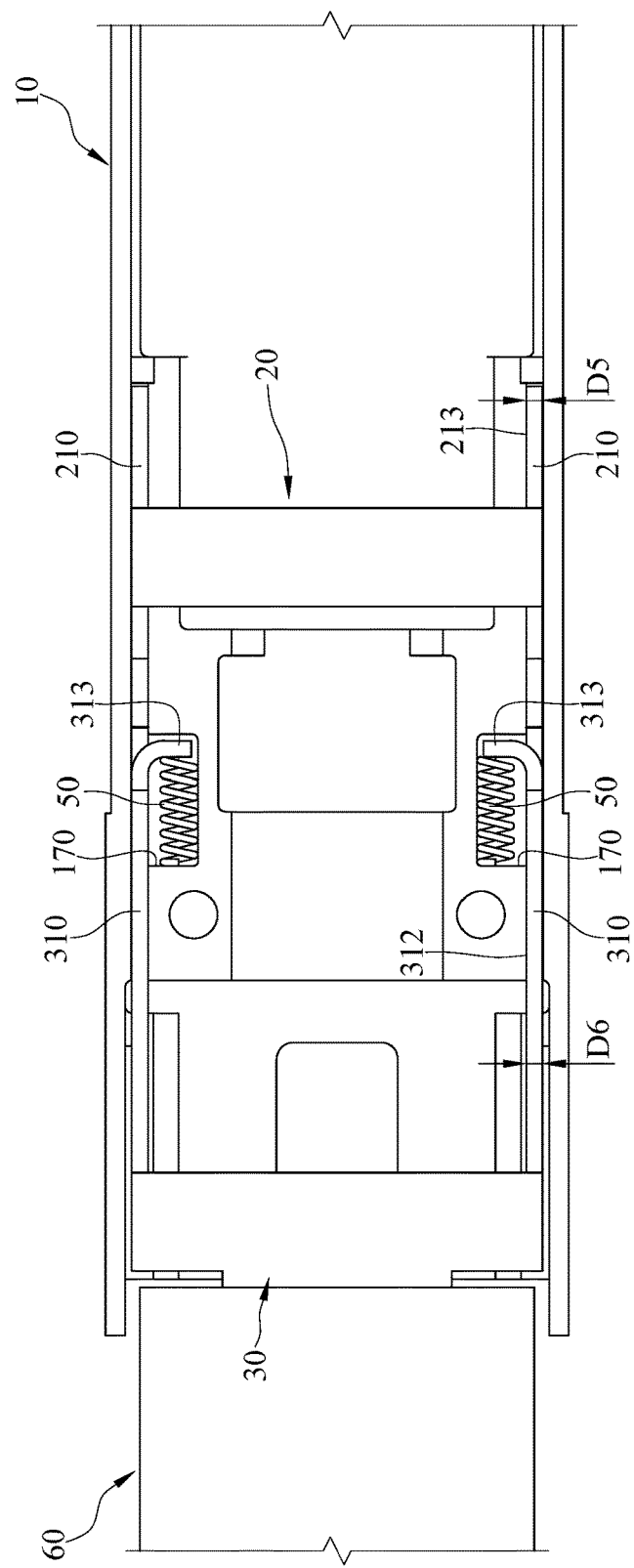
FIG. 4 is a top view of the optical transceiver in FIG. 1 with an upper case member of the case is omitted.
Figure 5:
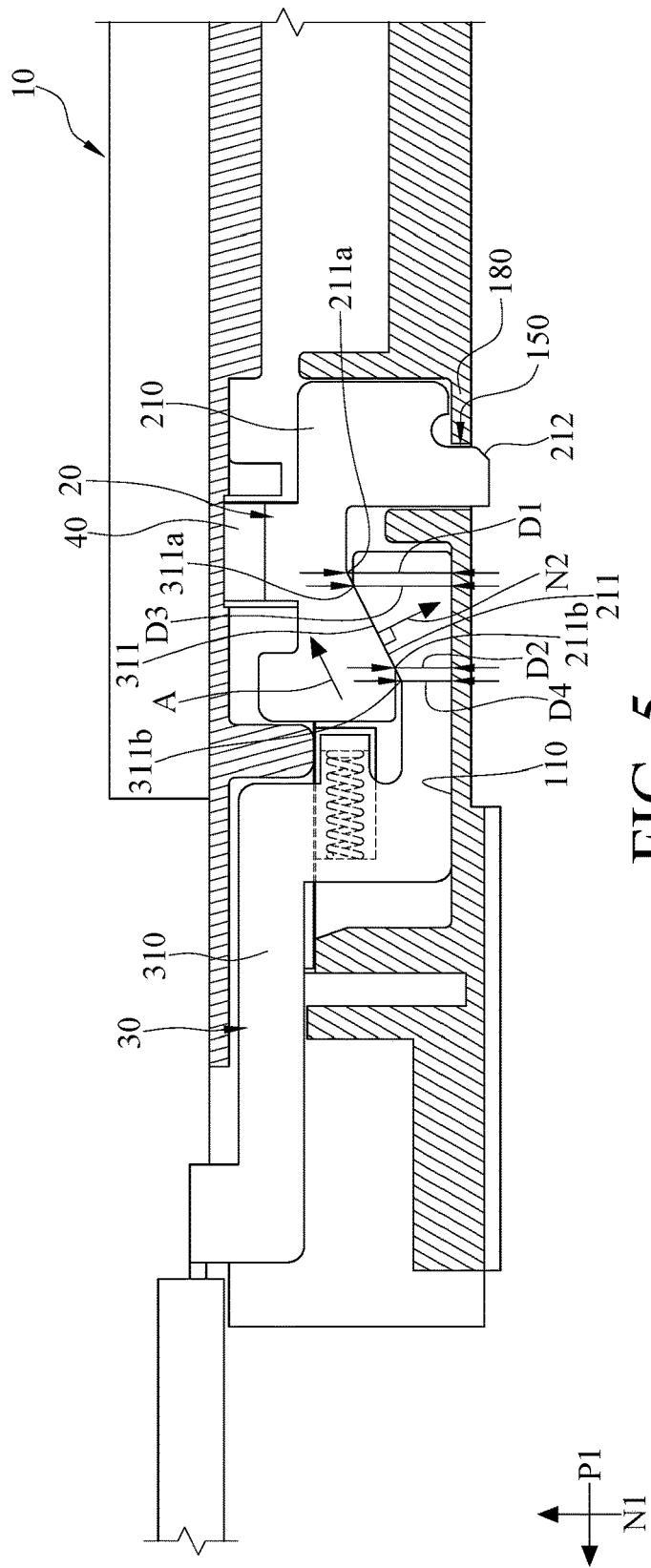
FIG. 5 is a cross-sectional view of the optical transceiver in FIG. 1.

Please refer to FIG. 1 to FIG. 5. FIG. 1 is a perspective view of an optical transceiver according to one embodiment of the present disclosure. FIG. 2 is an exploded view of the optical transceiver in FIG. 1. FIG. 3 is an enlarged view of the optical transceiver in FIG. 2. FIG. 4 is a top view of the optical transceiver in FIG. 1 with an upper case member of the case is omitted. FIG. 5 is a cross-sectional view of the optical transceiver in FIG. 1. In this embodiment, an optical transceiver 1 is disclosed, and the optical transceiver 1 includes a case 10, a fastening component 20, a driving component 30, a resilient component 40 and two elastic components 50. The optical transceiver 1 is configured to be plugged into a cage 2 (shown in FIG. 6A), and the cage 2 defines two fastening holes 22. It is worth noting that the number of the fastening holes 22 in the present disclosure is not limited by the above.

The case 10, for example, is made of metal. The case 10 defines a supporting surface 110, two inner lateral surfaces 120 and a top surface 130. The two inner lateral surfaces 120 are respectively connected to two opposite sides of the supporting surface 110, and the two inner lateral surfaces 120 are located between the supporting surface 110 and the top surface 130. The supporting surface 110, the two inner lateral surfaces 120 and the top surface 130 jointly defines an accommodation space 140. Two through holes 150 of the case are located on the supporting surface 110, and two guide grooves 160 of the case 10 are respectively located on the two inner lateral surfaces 120. The two guide grooves 160 are respectively connected to the two through holes 150, and the two through holes 150 respectively correspond to the two fastening holes 22 of the cage 2. In this embodiment, as shown in FIG. 2, the case 10 is consisted of an upper case member and a lower case member. The top surface 130 may serve as the upper case member, and the supporting surface 110 and the inner lateral surfaces 120 could be considered as the lower case member. In some embodiments, the case is a one-piece metal case. Moreover, for the purpose of illustration, FIGS. 2 and 3 only show the elements on the left inner lateral surface 120 without presenting the elements on the right inner lateral surface 120.

The fastening component 20 is movably disposed in the accommodation space 140 of the case 10. The fastening component 20 includes two fastening members 210 connected to each other. The two fastening members 210 are slidably disposed in the two guide grooves 160, respectively. Each fastening member 210 defines a pressed slope 211 and a guide slope 212. Each pressed slope 211 defines a first end 211a and a second end 211b. The vertical distance D1 between the first end 211a and the supporting surface 110 is larger than the vertical distance D2 between the second end 211b and the supporting surface 110. Each pressed slope 211 extends along a direction A, and there is an acute angle between the direction A and the extension direction of the supporting surface 110. The guide slope 212 is located in the proximity of the through hole 150 to which the fastening member 210 is close. It is worth noting that the number of the fastening members 210 in the present disclosure is not limited by the above. Furthermore, the two fastening members 210 of the fastening component 20 are connected to each other in this embodiment. In another embodiment, the two independent fastening members are separated from each other.

The driving component 30 is disposed within the case 10, and the driving component 30 is movable relative to the fastening component 20 along a pressing direction P1 to press the two pressed slopes 211. In detail, the driving component 30 includes two arms 310 located in the accommodation space 140 of the case 10, and each arm 310 is located between its respective pressed slope 211 of the fastening component 20 and the supporting surface 110 of the case 10. Each arm 310 defines a pressing slope 311 corresponding to the pressed slope 211, and the pressing slope 311 is located between its respective pressed slope 211 and the supporting surface 110. Each pressing slope 311 defines a third end 311a and a fourth end 311b. The vertical distance D3 between the third end 311a and the supporting surface 110 is larger than the vertical distance D4 between the fourth end 311b and the supporting surface 110. Each pressing slope 311 extends along the direction substantially parallel to the direction along which the pressed slope 211 extends (that is, the direction A). In one embodiment, those directions may not be perfectly parallel to each other, which allows for some room for tolerance, so long as the pressing slope 311 could be in contact with the pressed slope 211 and properly transfer the driving force. The arm 310 of the driving component 30 is movable relative to the fastening member 210 of the fastening component 20 along the pressing direction P1 with the pressing slope 311 contacting the pressed slope 211, so that the third end 311a is slidable along a direction from the first end 211a to the second end 211b of the fastening member 210. It is worth noting that the number of the arms 310 in the present disclosure is not limited by the above.

Furthermore, the two arms 310 of the driving component 30 are connected to each other in this embodiment, but the present disclosure is not limited thereto. In some embodiments, the two arms are separated from each other.

In this embodiment, the pressing direction P1 is substantially orthogonal to a normal direction N1 of the supporting surface 110 of the case 10, and the pressing direction P1 is non-orthogonal to a normal direction N2 of the pressed slope 211 of the fastening component 20, but the present disclosure is not limited thereto. In some embodiments, the pressing direction is not orthogonal to the normal direction of the supporting surface, but is still non-orthogonal to the normal direction of the pressed slope 211.

Furthermore, as shown in FIG. 4, a side surface 213 of each fastening member 210 of the fastening component 20 is away from the inner lateral surface 120 of the case 10. A side surface 312 of each arm 310 of the driving component 30 is away from the inner lateral surface 120 either. In this embodiment, the distance D5 between the side surface 213 of the fastening member 210 and the inner lateral surface 120 is equal to the distance D6 between the side surface 312 of the arm 310 and the inner lateral surface 120. In other words, the arm 310 of the driving component 30 is substantially equal to the fastening member 210 of the fastening component 20 in thickness along a normal direction of the inner lateral surface 120. Therefore, the side surface 213 is flush with the side surface 312 so as to more efficiently utilize the space in the case 10 allowing for accommodating electronic components (not shown in the drawings). As such, undesired interference between the electronic components and either the driving component 30 or the fastening component 20 may be minimized. In some embodiments, the distance D5 between the side surface 213 and the inner lateral surface 120 is larger than the distance D6 between the side surface 312 and the inner lateral surface 120.

The resilient component 40, for example, is an elastic sheet which is located in the accommodation space 140 of the case 10. When the fastening component 20 moves close to the top surface 130, the resilient component 40 is pressed by the fastening members 210 of the fastening component 20, so that the resilient component 40 stores elastic potential energy. The resilient component 40 is able to automatically release the elastic potential energy to move the fastening component 20 away from the top surface 130.

Each of the two elastic components 50, for example, is a compression spring located in the accommodation space 140 of the case 10. In detail, the case 10 further defines two first limiting surfaces 170 connected to the supporting surface 110, and each arm 310 of the driving component 30 defines a second limiting surface 313 facing its respective first limiting surface 170. One of the two elastic components 50 is disposed between one first limiting surface 170 and one second limiting surface 313, and the other elastic component 50 is disposed between the other first limiting surface 170 and the other second limiting surface 313.

Figure 6A:
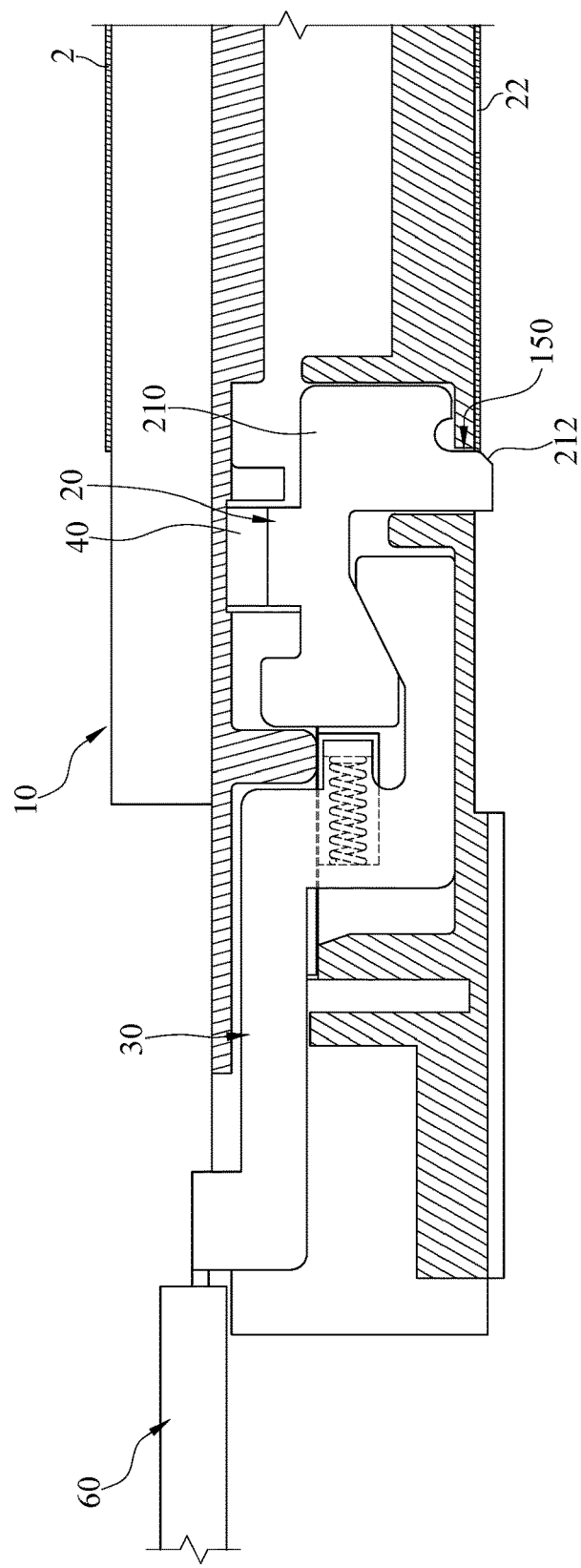
FIG. 6A to FIG. 6C are schematic views of plugging the optical transceiver in FIG. 5 into a cage.
Figure 6B:
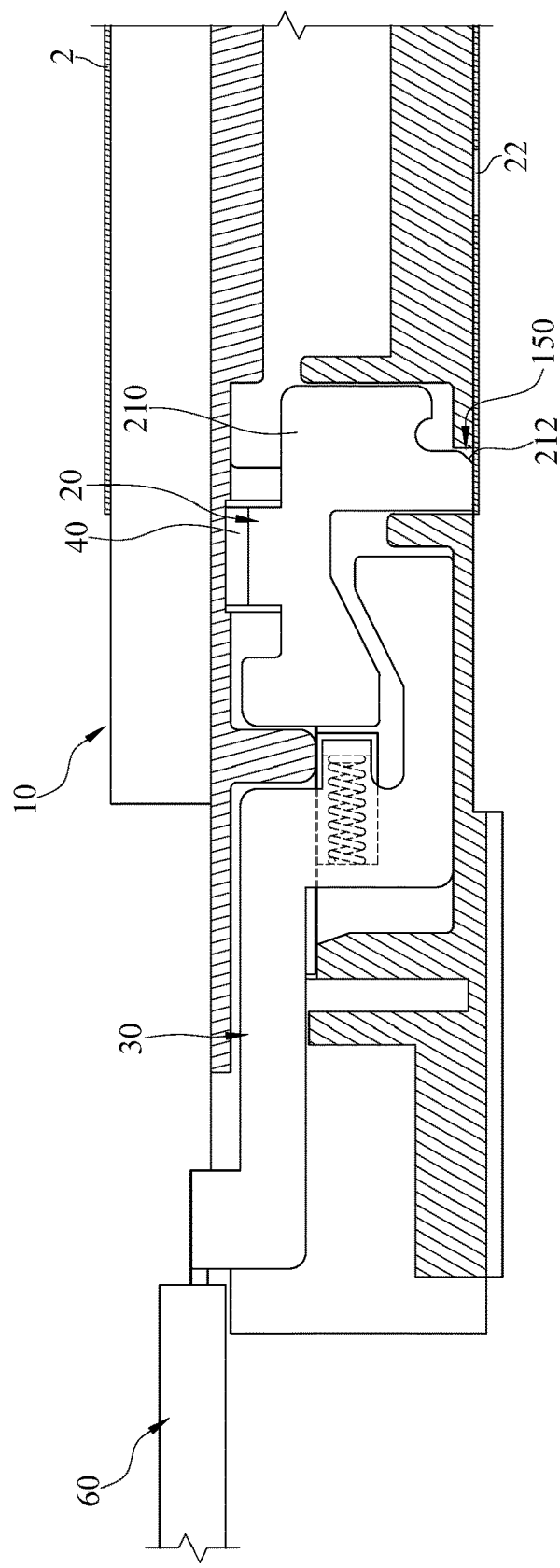
Figure 6C:
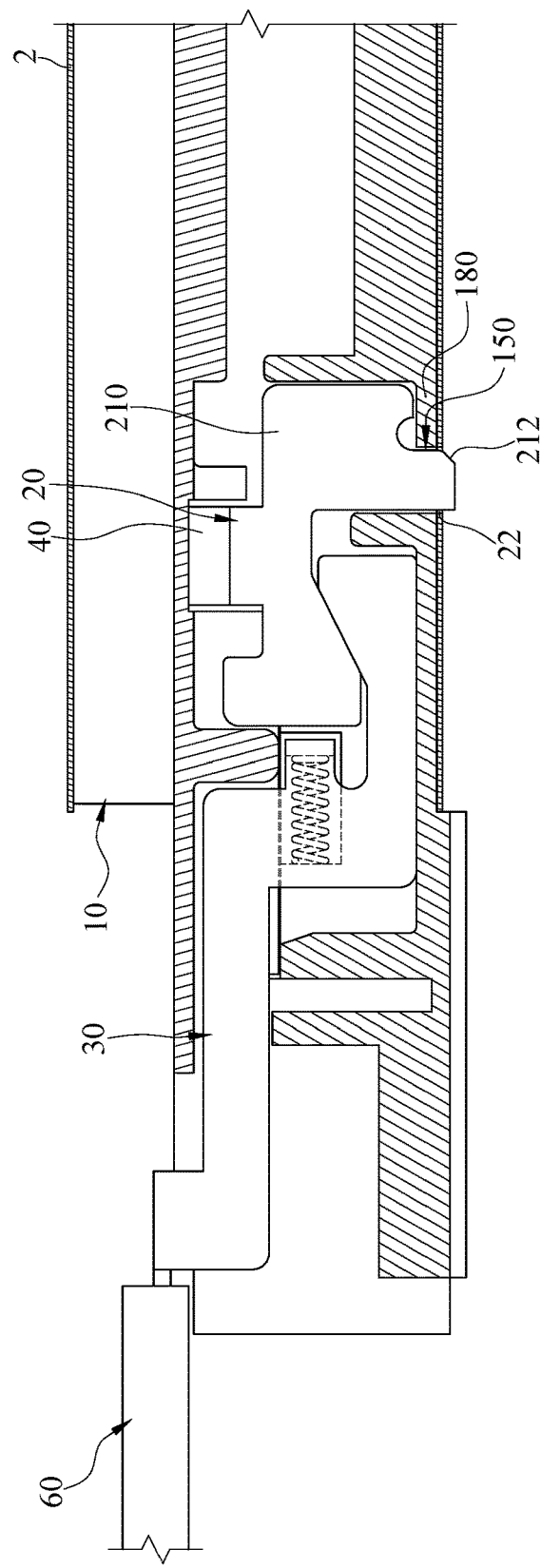
Figure 7A:
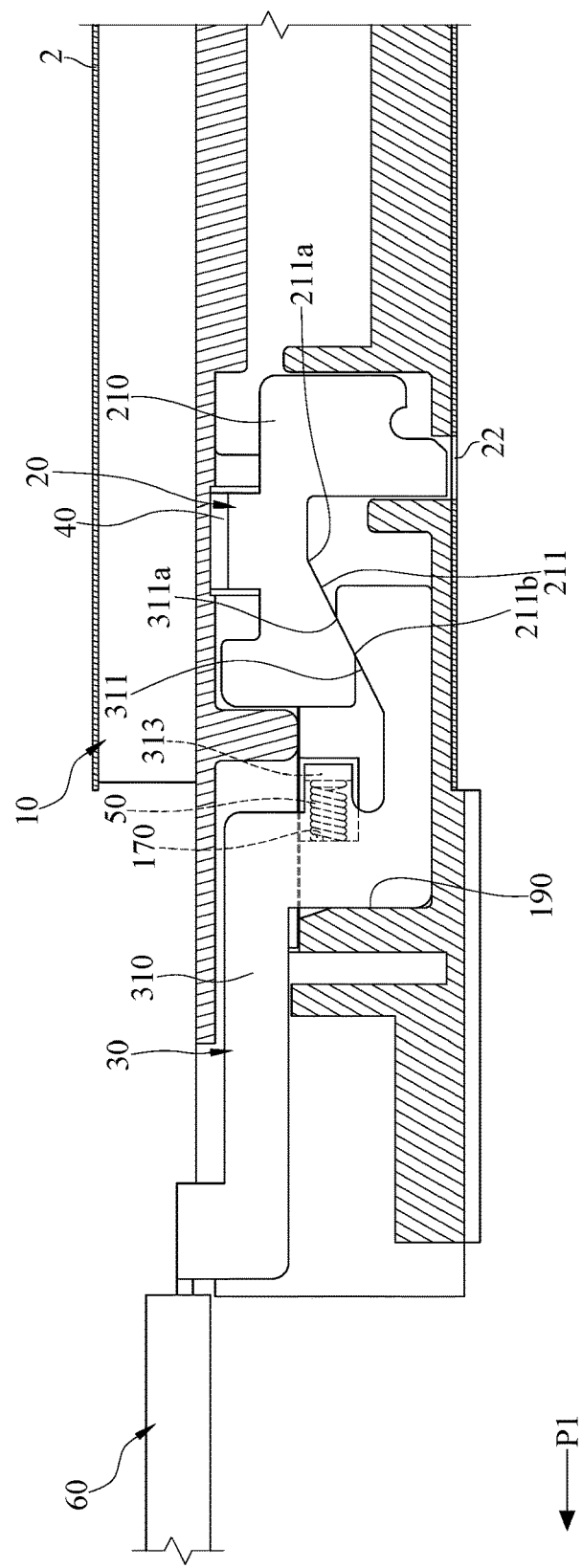
FIG. 7A and FIG. 7B are schematic views of drawing the optical transceiver in FIG. 5C out of the cage.

The illustration of the optical transceiver 1 being plugged into the cage 2 is described hereafter. Please refer to FIG. 6A to FIG. 0.6C and FIG. 7A. FIG. 6A to FIG. 6C are schematic views of the optical transceiver in FIG. 5 being plugged into a cage. In this embodiment, the fastening component 20 is movably disposed on the case 10 to be at least at a fastening position (as shown in FIG. 6C) and a releasing position (FIG. 7A). When the fastening component 20 is at the fastening position, the fastening member 210 protrudes out of the case 10 from the through hole 150, and the third end 311a of the pressing slope 311 is closer to the first end 211a of the pressed slope 211 than the second end 211b. Also, the pressing slope 311 does not press the pressed slope 211 of the fastening component 20 at the fastening position. For example, the pressing slope 311 may be spaced apart from the pressed slope 211; or, the pressing slope 311 may contact the pressed slope 211 without any interaction force therebetween.

As shown in FIG. 6A, the fastening component 20 is at the fastening position. When a user plugs the optical transceiver 1 into the cage 2, the case 10 is inserted into the cage 2. During the insertion of the case 10, the guide slope 212 of each fastening member 210 of the fastening component 20 is pressed against the edge of the cage 2 so that the fastening component 20 moves from the fastening position to the releasing position, which may enable the resilient component 40 to store the elastic potential energy because of the resilient component 40 being pressed. The fastening component 20 moves through the through hole 150 into the case 10 by the interaction between the fastening member 210 and the guide slope 212, and thus it is favorable for the fastening component 20 moving without undue external force. When the fastening component 20 is at the releasing position, the fastening members 210 are not pressed against the cage 2 so that the optical transceiver 1 is movable in the cage 2.

As shown in FIG. 6B and FIG. 6C, when the optical transceiver 1 moves to a specific position where the two through holes 150 respectively correspond to the two fastening holes 22 of the cage 2, the resilient component 40 releases its elastic potential energy so as to move each fastening member 210 through its respective through hole 150. When each fastening member 210 is fastened to its respective fastening hole 22, the fastening component 20 moves to the fastening position, and the optical transceiver 1 is securely plugged into and fastened to the cage 2.

A conventional optical transceiver is easily influenced by undue external force so that it could be removed from the cage unintentionally. In this embodiment, the fastening member 210 of the fastening component 20 is movably disposed in the guide groove 160. Thus, when an external force is applied on the optical transceiver 1, the external force is transferred from the fastening component 20 to the case 10 through the wall of the guide groove 160 so as to prevent the fastening member 210 and the fastening hole 22 from unintentionally separating, thereby improving the stability between the optical transceiver 1 and the cage 2.

Figure 7B:
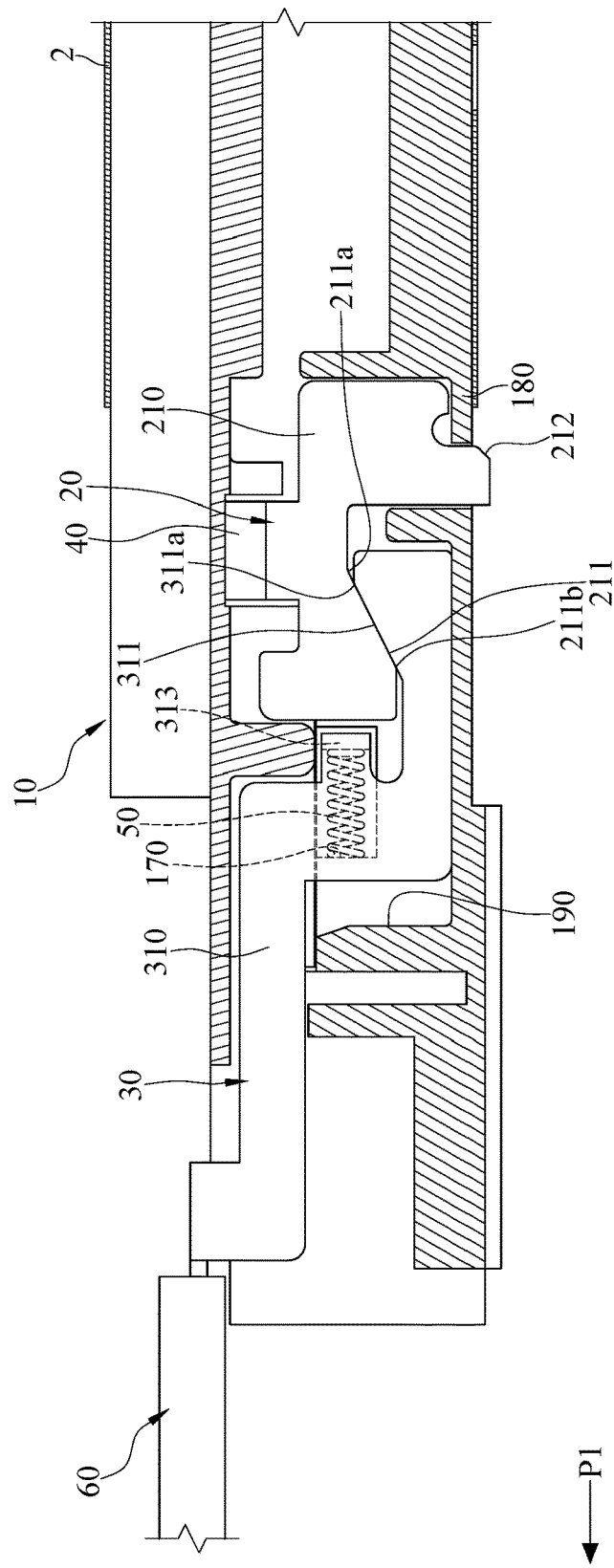

The illustration of drawing the optical transceiver 1 out of the cage 2 is described hereafter. FIG. 7A and FIG. 7B are schematic views of drawing the optical transceiver in FIG. 5C out of the cage.

As shown in FIG. 7A, when the user attempts to remove the optical transceiver 1 from the cage 2 by pulling a bail 60 of the optical transceiver 1 the driving component 30 may therefore move along the pressing direction P1, and the pressing slope 311 of the driving component 30 presses the pressed slope 211 of the fastening component 20. When the pressed slope 211 is pressed by the driving component 30, the third end 311a of the pressing slope 311 may slide towards the second end 211b so as to move the fastening component 20 from the fastening position to the releasing position. When the fastening component 20 is at the releasing position, each fastening member 210 is removed from its respective fastening hole 22. Therefore, the optical transceiver 1 is movable along the pressing direction P1 before being drawn out of the cage 2. Moreover, the resilient component 40 is pressed by the fastening members 210 so as to store elastic potential energy when the fastening component 20 is at the releasing position. Furthermore, when the driving component 30 moves along the pressing direction P1, the second limiting surfaces 313 of the arms 310 move close to the first limiting surface 170 so as to respectively compress the elastic components 50.

As shown in FIG. 7B, when the optical transceiver 1 is completely removed from the cage 2, the bail 60 is released by the user so that the elastic components 50 spring back to move the driving component 30. Thus, the third end 311a of the pressing slope 311 may slide from the second end 211b to the first end 211a of the pressed slope 211. Therefore, the fastening component 20 is not pressed by the driving component 30, and the resilient component 40 releases its elastic potential energy so as to move the fastening component 20 to the fastening position.

When an optical transceiver is plugged into the cage, it is possible electromagnetic interference (EMI) between electronic components in the optical transceiver and electronic devices disposed around the cage may result. As shown in FIG. 5 and FIG. 6C, the case 10 includes two protrusions 180 which are respectively located near the two through holes 150 in this embodiment. The fastening member 210 of the fastening component 20 is pressed against the protrusions 180 when the fastening component 20 is at the fastening position. The protrusions 180 act as barriers between the electronic members in the case 10 and an outside electronic device near the optical transceiver 1 so as to be favorable for preventing EMI. It is worth noting that the number of the protrusions 180 in the present disclosure is not limited by the above. In some embodiments, the number of protrusions 180 is consistent with the number of through holes 150.

Furthermore, as shown in FIG. 3, FIG. 7A and FIG. 7B, the case 10 further defines a stopping surface 190 connected to the supporting surface 110, and the arm 310 of the driving component 30 is pressed against the stopping surface 190 when the fastening component 20 is at the releasing position. The stopping surface 190 is for limiting the movement of the driving component 30 so as to prevent both the driving component 30 and the case 10 from being damaged due to excessive pulling force exerted on the bail 60.

According to the present disclosure, the pressed slope of the fastening component defines a first end and a second end, and the vertical distance between the first end and the supporting surface is different from the vertical distance between the second end and the supporting surface. The driving component is movable relative to the fastening component along the pressing direction to press the pressed slope, and the fastening component is movable from the fastening position to the releasing position by the interaction between the pressed slope of the fastening component and the pressing slope of the driving component. Therefore, the optical transceiver is able to be easily plugged into and drawn out of the cage by moving the driving component.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. An optical transceiver, pluggable into a cage, comprising:
   a case defining a supporting surface;
   a fastening component movably disposed in the case to be at least at a fastening position and a releasing position, the fastening component defining a pressed slope defining a first end and a second end, a vertical distance between the first end and the supporting surface being different from a vertical distance between the second end and the supporting surface; and
   a driving component disposed in the case, the driving component being movable relative to the fastening component along a pressing direction to press the pressed slope, the fastening component being movable to the releasing position by interaction between the fastening component and the driving component, and the pressing direction being non-orthogonal to a normal direction of the pressed slope;

wherein the fastening component is fastened to a fastening hole of the cage when the fastening component is at the fastening position, and the fastening component is released from the fastening hole when the fastening component is at the releasing position.

2. The optical transceiver according to claim 1, wherein the pressing direction is substantially orthogonal to a normal direction of the supporting surface of the case.

3. The optical transceiver according to claim 1, wherein the driving component is pullable along the pressing direction to press the pressed slope.

4. The optical transceiver according to claim 1, wherein a part of the driving component is located between the pressed slope of the fastening component and the supporting surface of the case, and the vertical distance between the first end and the supporting surface is larger than the vertical distance between the second end and the supporting surface.

5. The optical transceiver according to claim 1, wherein the driving component defines a pressing slope, the pressing slope presses the pressed slope when the driving component moves relative to the fastening component, and the fastening component is movable to the releasing position by interaction between the pressing slope and the pressed slope.

6. The optical transceiver according to claim 5, wherein the pressing slope is located between the pressed slope and the supporting surface, the pressing slope defines a third end and a fourth end, the vertical distance between the first end and the supporting surface is larger than the vertical distance between the second end and the supporting surface, a vertical distance between the third end and the supporting surface is larger than a vertical distance between the fourth end and the supporting surface, and the third end slides along a direction from the first end to the second end when the driving component moves along the pressing direction.

7. The optical transceiver according to claim 5, wherein the case further defines an inner lateral surface connected to the supporting surface, the driving component comprises an arm disposed in the case, the arm defines the pressing slope, a side surface of the fastening component is away from the inner lateral surface of the case, a side surface of the arm is away from the inner lateral surface, and a distance between the side surface of the fastening component and the inner lateral surface is larger than or equal to a distance between the side surface of the arm and the inner lateral surface.

8. The optical transceiver according to claim 7, wherein a thickness of the arm of the driving component is substantially equal to a thickness of the fastening component in a normal direction of the inner lateral surface.

9. The optical transceiver according to claim 8, wherein the side surface of the fastening component is flush with the side surface of the driving component.

10. The optical transceiver according to claim 1, wherein the fastening component comprises two fastening members connected to each other, each of the two fastening members defines the pressed slope, the case further defines two inner lateral surfaces connected to two opposite sides of the supporting surface, the two inner lateral surfaces and the supporting surface jointly defines an accommodation space, the two fastening members are located in the accommodation space and respectively disposed on the two inner lateral surfaces, and the two fastening members jointly move relative to the case when the driving component presses the fastening component.

11. The optical transceiver according to claim 1, wherein the fastening component is disposed in the case, the case further defines a through hole located on the supporting surface, the through hole corresponds to the fastening hole of the cage, and a part of the fastening component protrudes out of the case from the through hole when the fastening component is at the fastening position.

12. The optical transceiver according to claim 11, wherein the case further defines a guide groove connected to the through hole, the fastening component is slidably disposed in the guide groove, the case comprises a protrusion located near the through hole, and a part of the fastening component is pressed against the protrusion when the fastening component is at the fastening position.

13. The optical transceiver according to claim 1, further comprising a resilient component disposed in the case, wherein the resilient component is pressed by the fastening component to store an elastic potential energy when the fastening component is at the releasing position, and the elastic potential energy is released when the resilient component moves the fastening component from the releasing position to the fastening position.

14. The optical transceiver according to claim 1, wherein the fastening component defines a guide slope configured to be pressed against an edge of the cage.

15. The optical transceiver according to claim 1, further comprising an elastic component, wherein the case further defines a first limiting surface connected to the supporting surface, the driving component defines a second limiting surface facing the first limiting surface, and the elastic component is disposed between the first limiting surface and the second limiting surface.

16. The optical transceiver according to claim 1, wherein the case further defines a stopping surface connected to the supporting surface, and the driving component is pressed against the stopping surface when the fastening component is at the releasing position.

17. An optical transceiver, comprising:
a case defining a supporting surface;
a fastening component movably disposed in the case, the fastening component defining a pressed slope defining a first end and a second end, a vertical distance between the first end and the supporting surface being different from a vertical distance between the second end and the supporting surface; and
a driving component disposed in the case, the driving component defining a pressing slope facing the pressed slope defining a third end and a fourth end, a vertical distance between the third end and the supporting surface being different from a vertical distance between the fourth end and the supporting surface, the pressed slope and the pressing slope extending along substantially same direction, and the driving component being movable along a pressing direction relative to the case to press the fastening component with interaction between the pressing slope and the pressed slope.

* * * * *